(12) United States Patent
Takata

(10) Patent No.: US 9,263,749 B2
(45) Date of Patent: Feb. 16, 2016

(54) FUEL CELL

(71) Applicant: MURATA MANUFACTURING CO., LTD., Nagaokakyo-Shi (JP)

(72) Inventor: Kazuhide Takata, Nagaokakyo (JP)

(73) Assignee: MURATA MANUFACTURING CO., LTD., Nagaokakyo-Shi, Kyoto-Ku (JP)

( * ) Notice: Subject to any disclaimer, the term of this patent is extended or adjusted under 35 U.S.C. 154(b) by 128 days.

(21) Appl. No.: 14/030,809

(22) Filed: Sep. 18, 2013

(65) Prior Publication Data

US 2014/0017596 A1 Jan. 16, 2014

Related U.S. Application Data

(63) Continuation of application No. PCT/JP2012/057682, filed on Mar. 26, 2012.

(30) Foreign Application Priority Data

Mar. 31, 2011 (JP) .................................. 2011-079433

(51) Int. Cl.
*H01M 8/02* (2006.01)
*H01M 8/10* (2006.01)
*H01M 8/12* (2006.01)

(52) U.S. Cl.
CPC .... *H01M 8/0215* (2013.01); *H01M 2008/1095* (2013.01); *H01M 2008/1293* (2013.01); *Y02E 60/50* (2013.01); *Y02E 60/525* (2013.01)

(58) Field of Classification Search
CPC ............ H01M 8/0206; H01M 8/0256; H01M 8/1213; H01M 8/1226
See application file for complete search history.

(56) References Cited

U.S. PATENT DOCUMENTS

| | | | |
|---|---|---|---|
| 6,183,897 B1 * | 2/2001 | Hartvigsen et al. ............ | 429/465 |
| 2003/0077498 A1 | 4/2003 | Cable et al. | |
| 2003/0082434 A1 * | 5/2003 | Wang et al. ..................... | 429/40 |
| 2005/0227134 A1 | 10/2005 | Nguyen | |
| 2011/0143250 A1 * | 6/2011 | Takata et al. .................. | 429/457 |
| 2012/0171464 A1 | 7/2012 | Kailer et al. | |

FOREIGN PATENT DOCUMENTS

| | | |
|---|---|---|
| CN | 101464606 A | 7/2009 |
| JP | S-644983 A | 1/1989 |
| JP | H-01173975 A | 7/1989 |
| JP | H-05144463 A | 6/1993 |
| JP | 05-234607 | 9/1993 |
| JP | 2001052725 A | 2/2001 |
| JP | 2003-132914 A | 5/2003 |
| JP | 2003-317738 A | 11/2003 |
| JP | 2004-247087 A | 9/2004 |

(Continued)

OTHER PUBLICATIONS

PCT/JP2012/057682, International Search Report, date of mailing May 22, 2012.

(Continued)

*Primary Examiner* — Muhammad Siddiquee
(74) *Attorney, Agent, or Firm* — Arent Fox LLP

(57) ABSTRACT

Provided is a fuel cell having a long product life. In the fuel cell, an interlayer is arranged between a portion of an interconnector which contains at least one of Ag, Pd, Pt, Fe, Co, Cu, Ru, Rh, Re and Au and a first electrode containing Ni. The interlayer is formed of a conductive ceramic.

3 Claims, 12 Drawing Sheets

(56) References Cited

FOREIGN PATENT DOCUMENTS

| | | |
|---|---|---|
| JP | WO 2006/016627 A1 | 2/2006 |
| JP | 2006-196279 A | 7/2006 |
| JP | 2008-053045 A | 3/2008 |
| JP | 2008-077913 A | 4/2008 |
| JP | 2008-117702 A | 5/2008 |
| WO | WO-2004/088783 A1 | 10/2004 |
| WO | WO-2010-007722 A1 | 1/2010 |

OTHER PUBLICATIONS

PCT/JP2012/057682, Written Opinion of International Searching Authority, date of mailing May 22, 2012.

* cited by examiner

FUEL CELL

This is a continuation of application Serial No. PCT/JP2012/057682, filed Mar. 26, 2012, the entire contents of which are incorporated herein by reference.

TECHNICAL FIELD

The present invention relates to a fuel cell. In particular, the present invention relates to a solid oxide fuel cell.

BACKGROUND ART

In recent years, attention to fuel cells has been increased as a new energy source. Examples of fuel cells include solid oxide fuel cells (SOFC), molten carbonate fuel cells, phosphoric acid fuel cells and polymer electrolyte fuel cells. Among these fuel cells, solid oxide fuel cells do not necessarily require the use of a liquid component and can be internally modified when a hydrocarbon fuel is used. Therefore, research and development on solid oxide fuel cells is being vigorously conducted.

The solid oxide fuel bell includes a power generating element having a solid oxide electrolyte layer, and a fuel electrode and an air electrode which hold the solid oxide electrolyte layer therebetween. A separator which dividedly forms a channel for supplying a fuel gas is arranged on the fuel electrode. An interconnector for drawing the fuel electrode to outside is provided in the separator. Also, a separator which dividedly forms a channel for supplying an oxidant gas is arranged on the air electrode. An interconnector for drawing the air electrode to outside is provided in the separator.

For example, Patent Document 1 describes, as a constituent material of a fuel electrode, yttria stabilized zirconia (YSZ) containing at least one metal selected from Ni, Cu, Fe, Ru and Pd.

Further, Patent Document 1 describes, as a constituent material of an interconnector, a glass containing an Ag—Pd alloy.

PRIOR ART DOCUMENT

Patent Document

Patent Document 1: WO 2004/088783 A1 Publication

DISCLOSURE OF THE INVENTION

Problem to be Solved by the Invention

When a fuel electrode contains Ni and an interconnector contains an Ag—Pd alloy as described in Patent Document 1, the electrical connection between the fuel electrode and the interconnector is degraded with time, so that product life cannot be made sufficiently long.

The present invention has been devised in view of the situation described above, and an object of the present invention is to provide a fuel cell having a long product life.

Means for Solving the Problem

A fuel cell according to the present invention includes a power generating element, a separator and an interconnector. The power generating element has a solid oxide electrolyte layer, a first electrode and a second electrode. The first electrode is arranged on one principal surface of the solid oxide electrolyte layer. The second electrode is arranged on the other principal surface of the solid oxide electrolyte layer. The separator is arranged on the first electrode. The separator dividedly forms a channel facing the first electrode. The interconnector is connected to the first electrode. The first electrode contains Ni. The interconnector has a portion containing at least one of Ag, Pd, Pt, Fe, Co, Cu, Ru, Rh, Re and Au. The fuel cell according to the present invention further includes an interlayer. The interlayer is arranged between the portion containing at least one of Ag, Pd, Pt, Fe, Co, Cu, Ru, Rh, Re and Au and the first electrode. The interlayer is formed of a conductive ceramic.

In a specific aspect of the fuel cell according to the present invention, the interlayer is formed of a perovskite type oxide.

In another specific aspect of the fuel cell according to the present invention, the interlayer is formed of a perovskite type oxide represented by $ABO_3$ where A is at least one of Ca, Sr, Ba, La and Y; and B is at least one of Ti, V, Cr, Mn, Fe, Co, Mo, Ru, Rh, Pd and Re.

In another specific aspect of the fuel cell according to the present invention, the interlayer is formed of a perovskite type titanium oxide containing at least one of Sr, Ca and Ba.

In another specific aspect of the fuel cell according to the present invention, the interlayer is formed of a perovskite type titanium oxide represented by $(D_{1-x}E_x)_z(Ti_{1-y}G_y)O_3$ where D is at least of Sr, Ca and Ba; E is a rare earth element; G is at least one of Nb and Ta; $0 \leq x \leq 1$, $0 \leq y \leq 0.5$ and $0.66 \leq z \leq 1.5$.

In still another specific aspect of the fuel cell according to the present invention, the interlayer is formed of a perovskite type titanium oxide represented by $(Sr_{1-x}Ca_x)_z(Ti_{1-y}Nb_y)O_3$ where $0.5 \leq x \leq 0.9$, $0 \leq y \leq 0.3$ and $0.66 \leq z \leq 0.95$.

In yet another specific aspect of the fuel cell according to the present invention, the interlayer is formed of a perovskite type titanium oxide represented by $(Sr_{1-x}Ca_x)_z(Ti_{1-y}Nb_y)O_3$ where $0 \leq x < 0.5$, $0 \leq y \leq 0.3$ and $0.66 \leq z \leq 0.95$.

In yet another specific aspect of the fuel according to the present invention, the interlayer is formed of an n-type semiconductor.

In still another aspect of the fuel cell according to the present invention, the first electrode is formed of one of nickel oxide, yttrium oxide stabilized zirconia containing Ni, calcium oxide stabilized zirconia containing Ni, scandium oxide stabilized zirconia containing Ni, cerium oxide stabilized zirconia containing Ni, titanium oxide containing Ni, alumina containing Ni, magnesia containing Ni, yttria containing Ni, niobium oxide containing Ni and tantalum oxide containing Ni.

In still another aspect of the fuel cell according to the present invention, the interconnector has a portion containing Ag.

In yet another aspect of the fuel cell according to the present invention, the interconnector has a portion formed of an Ag—Pd alloy.

Advantageous Effect of the Invention

According to the present invention, a fuel cell having a long product life can be provided.

DESCRIPTION OF CARRYING OUT THE INVENTION

Figure 1:
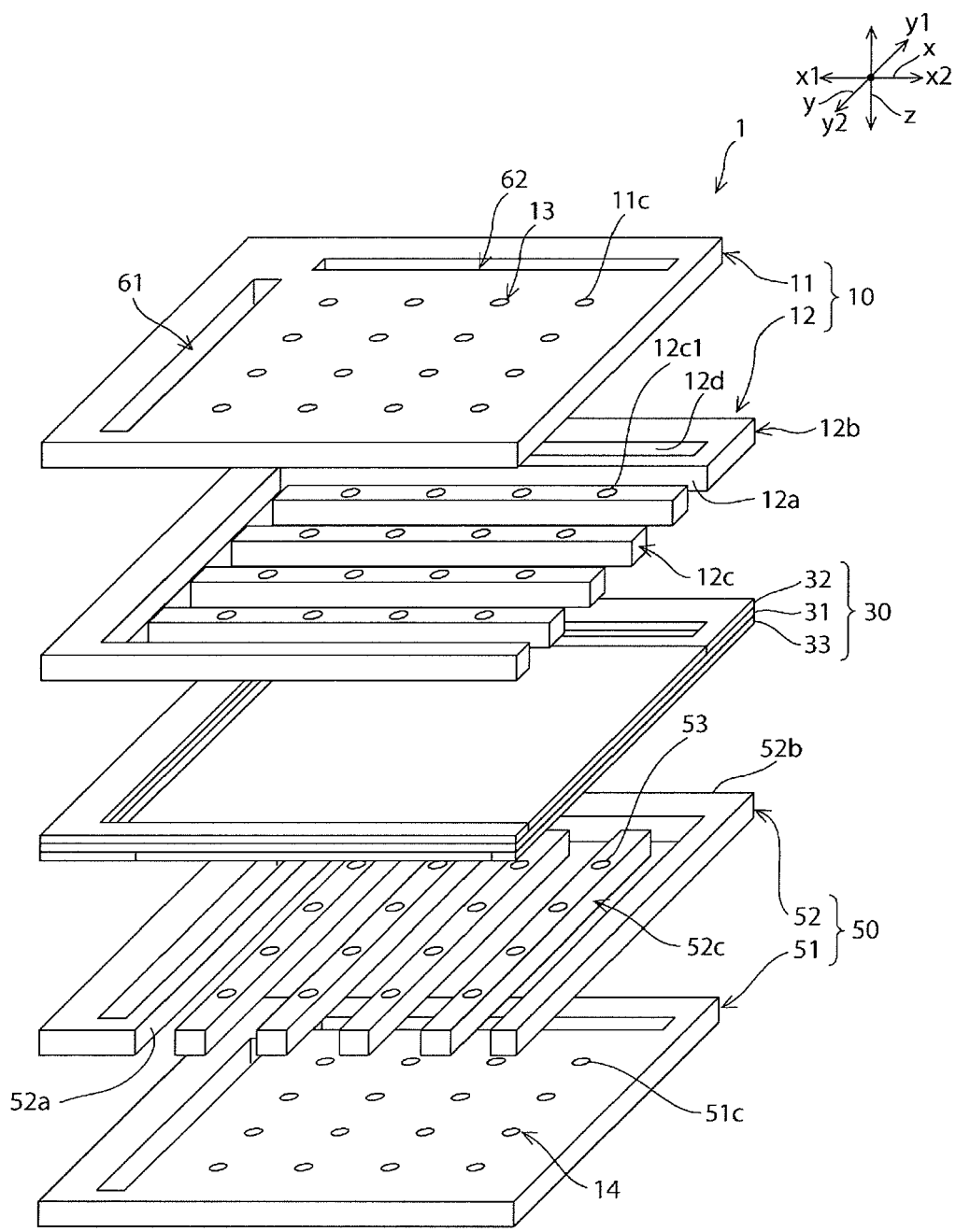
FIG. 1 is a schematic exploded perspective view of a fuel cell according to a first embodiment.

One example of a preferred embodiment of carrying out the present invention will be described below. It is to be noted that the embodiments described below are merely illustrative. The present invention is in no way limited to the embodiments described below.

In each drawing referred to in embodiments below, members having substantially the same function are denoted by the same symbols. The drawings of the in embodiments are schematically described, and the ratio of dimensions, etc., of an object in the drawing may be different from the ratio of dimensions, etc., of the actual object. The dimension ratio of an object may be different between drawings. A specific dimension ratio of an object should be inferred by considering the descriptions below.

First Embodiment

Figure 2:
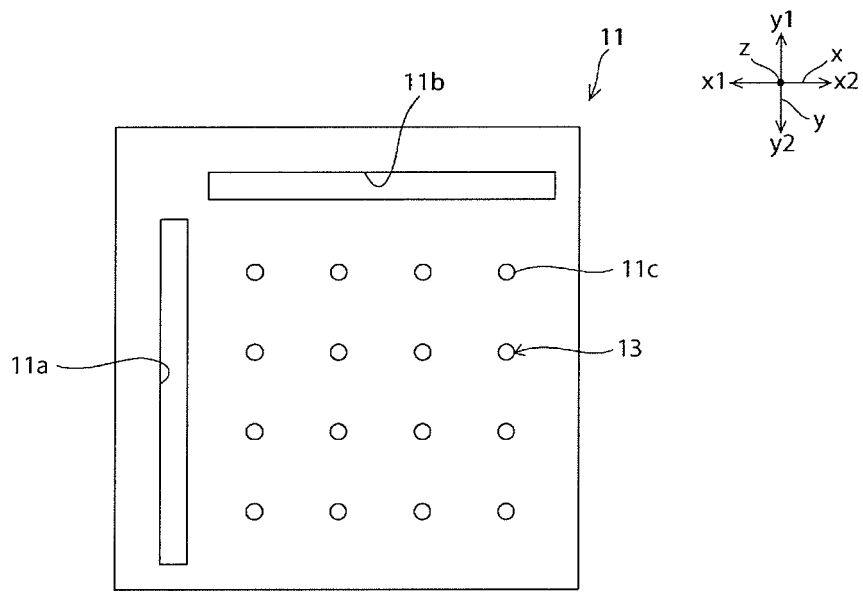
FIG. 2 is a schematic plan view of a first separator body in the first embodiment.
Figure 3:
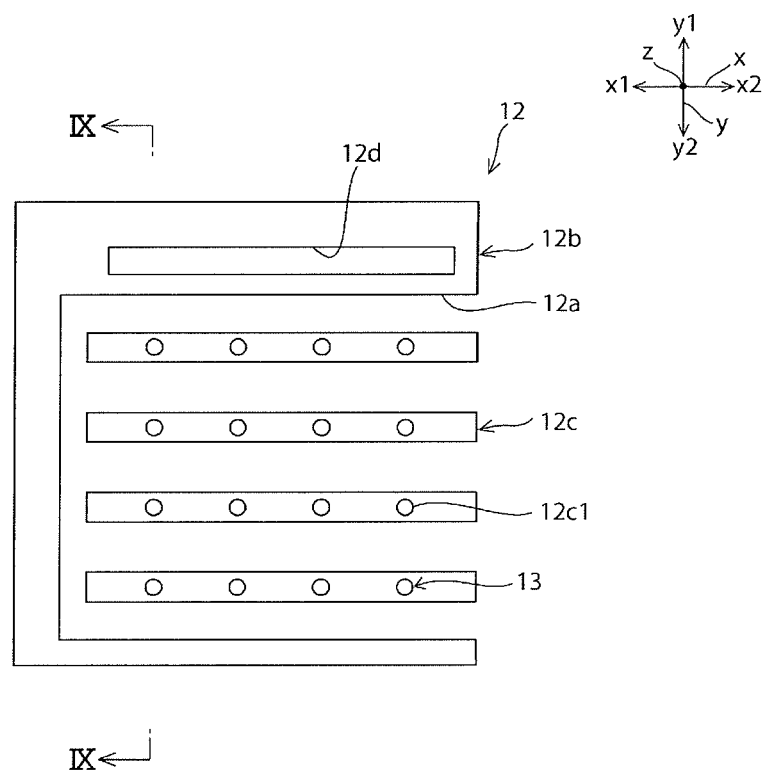
FIG. 3 is a schematic plan view of a first channel forming member in the first embodiment.
Figure 4:
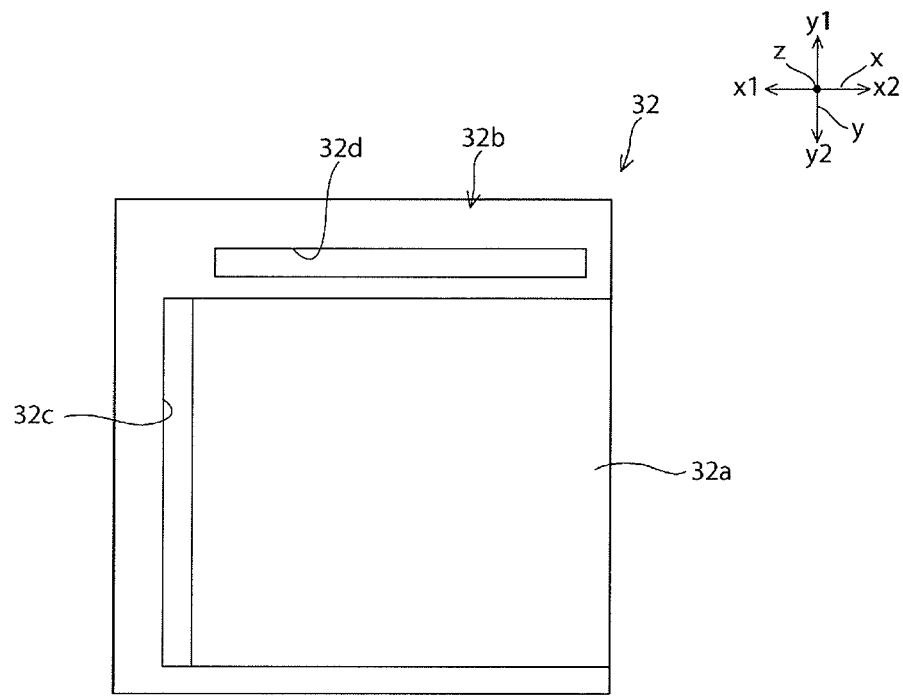
FIG. 4 is a schematic plan view of an air electrode layer in the first embodiment.
Figure 5:
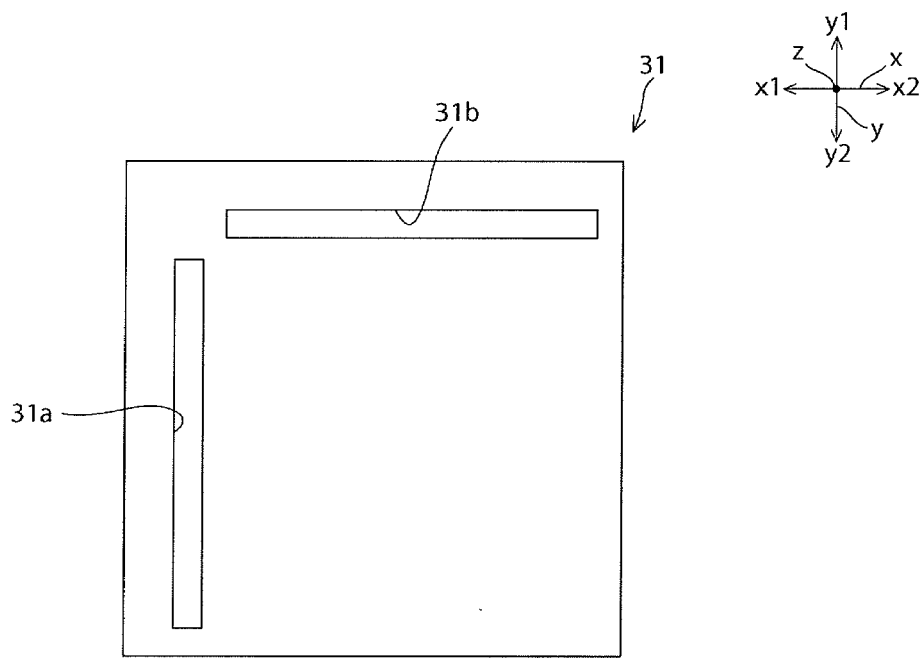
FIG. 5 is a schematic plan view of a solid oxide electrolyte layer in the first embodiment.
Figure 6:
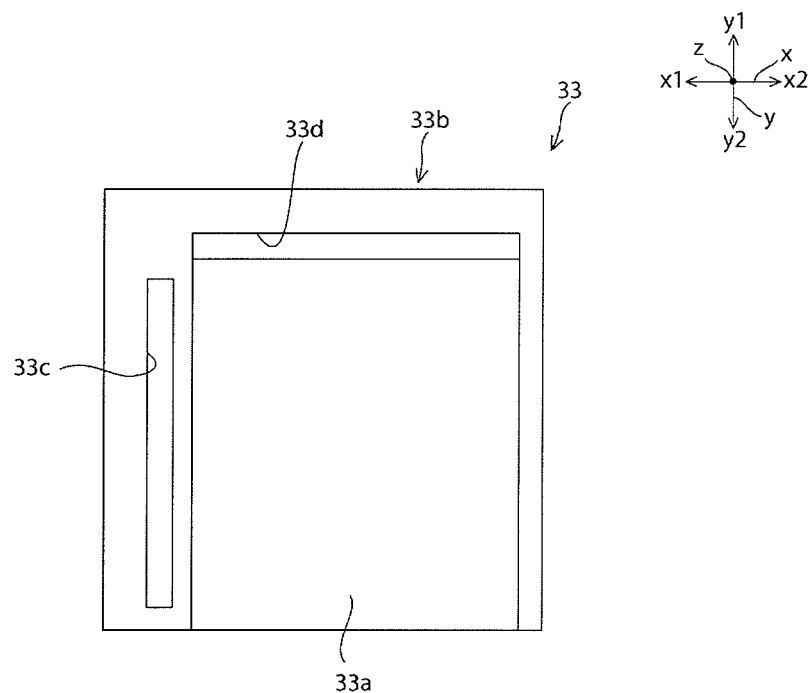
FIG. 6 is a schematic plan view of a fuel electrode layer in the first embodiment.
Figure 7:
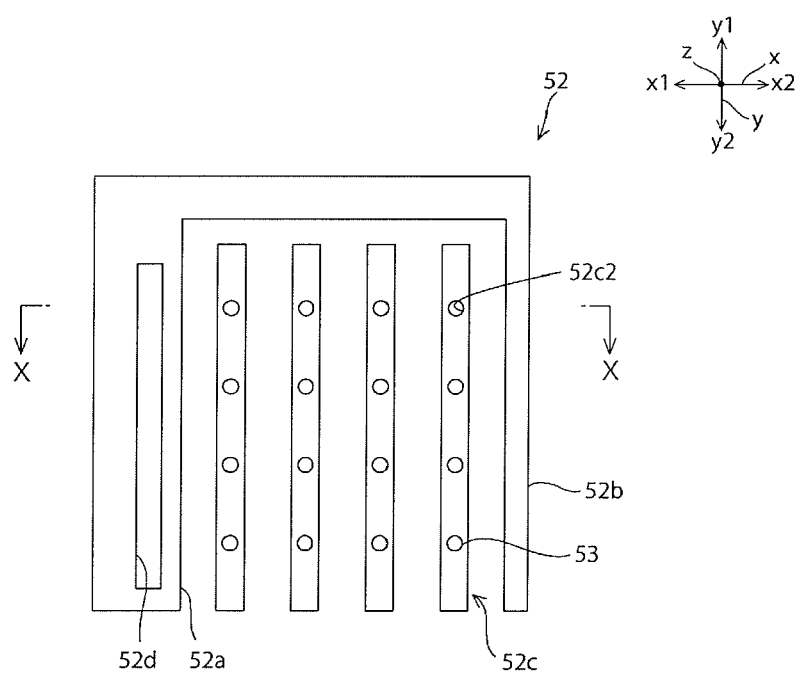
FIG. 7 is a schematic plan view of a second channel forming member in the first embodiment.
Figure 8:
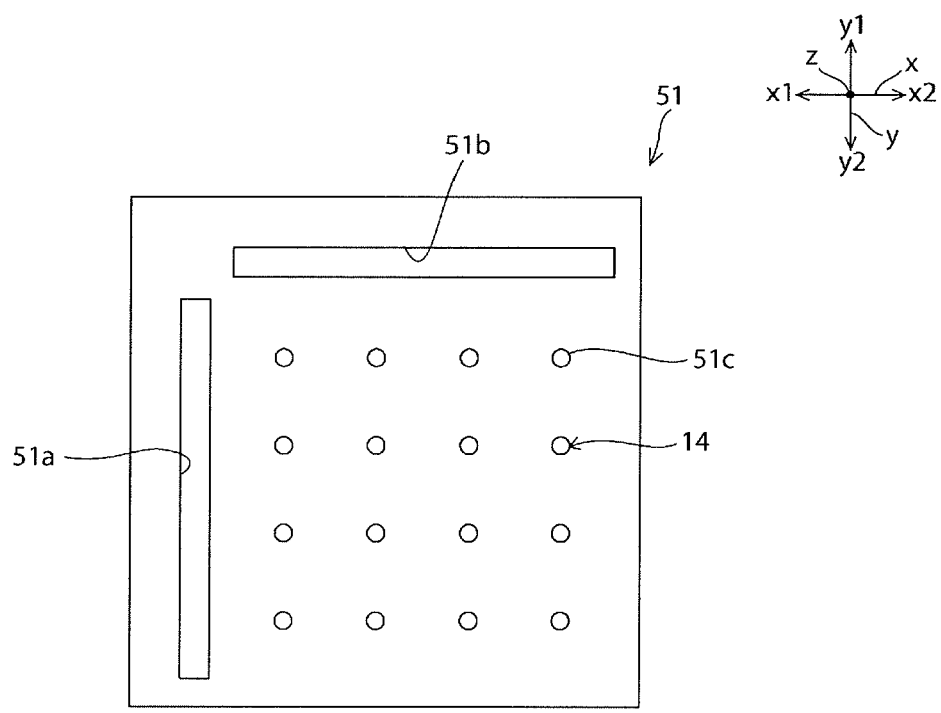
FIG. 8 is a schematic plan view of a second separator body in the first embodiment.
Figure 9:
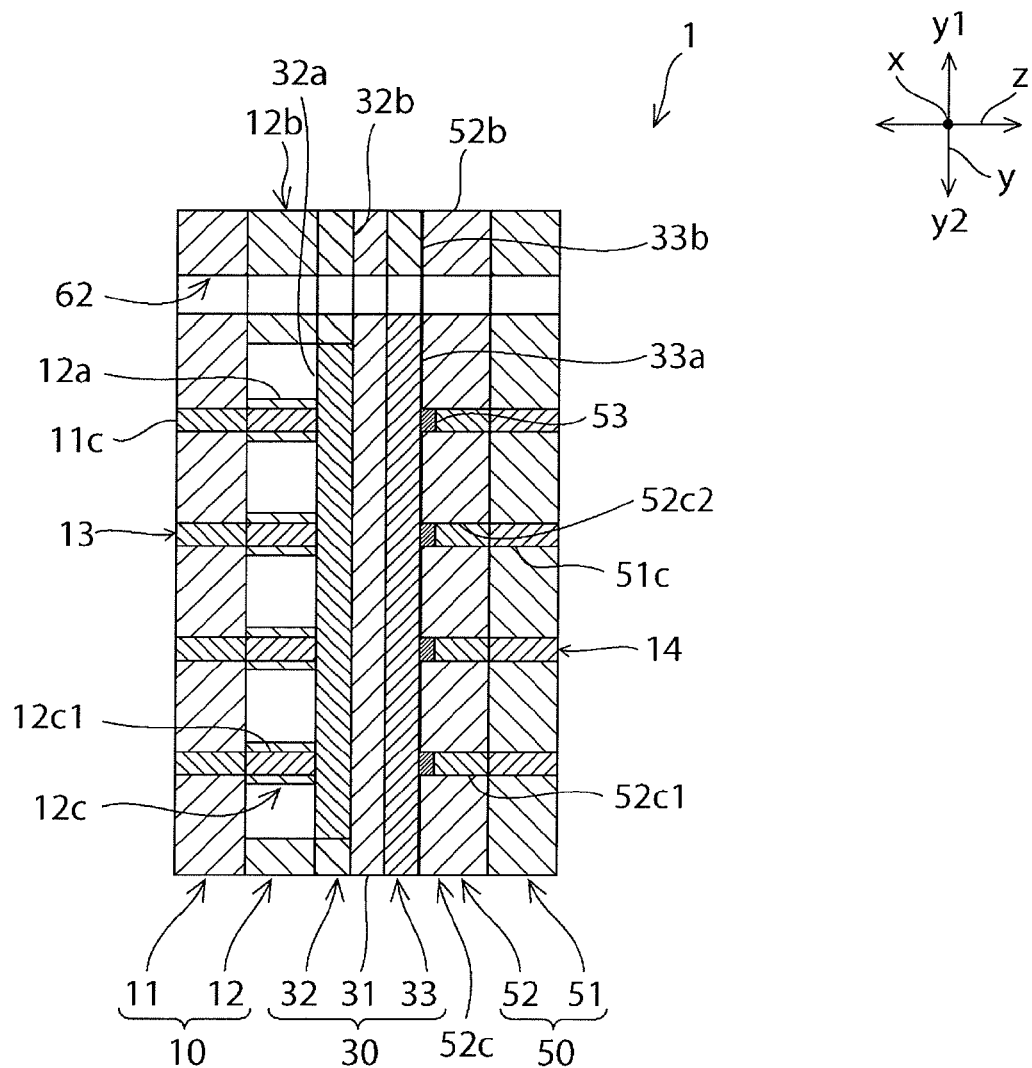
FIG. 9 is a schematic sectional view in the line IX-IX in FIG. 3.
Figure 10:
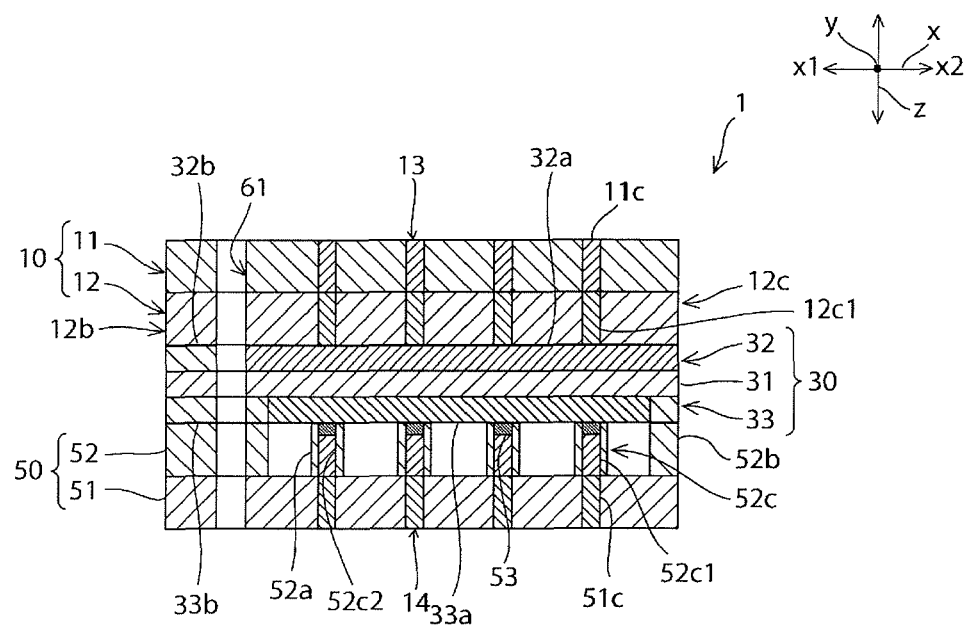
FIG. 10 is a schematic sectional view in the line X-X in FIG. 7.

FIG. 1 is a schematic exploded perspective view of a fuel cell according to a first embodiment. FIG. 2 is a schematic plan view of a first separator body in the first embodiment. FIG. 3 is a schematic plan view of a first channel forming member in the first embodiment. FIG. 4 is a schematic plan view of an air electrode layer in the first embodiment. FIG. 5 is a schematic plan view of a solid oxide electrolyte layer in the first embodiment. FIG. 6 is a schematic plan view of a fuel electrode layer in the first embodiment. FIG. 7 is a schematic plan view of a second channel forming member in the first embodiment. FIG. 8 is a schematic plan view of a second separator body in the first embodiment. FIG. 9 is a schematic sectional view in the line IX-IX in FIG. 3. FIG. 10 is a schematic sectional view in the line X-X in FIG. 7.

As shown in FIGS. 1, 9 and 10, a fuel cell 1 of this embodiment includes a first separator 10, a power generating element 30 and a second separator 50. In the fuel cell 1, the first separator 10, the power generating element 30 and the second separator 50 are laminated in this order.

The fuel cell 1 of this embodiment includes only one power generating element 30. However, the present invention is not limited to this configuration. For example, the fuel cell 1 of the present invention may include a plurality of power generating elements. In this case, adjacent power generating elements are isolated from each other by a separator. Electrical connection between power generating elements can be established by an interconnector. The interconnector may be provided separately from the separator, or the separator may be formed from a conductive material, so that the separator also has a function as an interconnector. That is, the interconnector may be formed integrally with the separator.

Power Generating Element 30

The power generating element 30 is a portion where an oxidant gas supplied from an oxidant gas channel (manifold for oxidant gas) 61 and a fuel gas supplied from a fuel gas channel (manifold for fuel gas) 62 react with each other to generate power. The oxidant gas can be formed from, for example, an oxygen-containing gas such as air or oxygen gas, etc. The fuel gas may be a gas containing a hydrogen gas, and a hydrocarbon gas such as a carbon monoxide gas, etc.

Solid Oxide Electrolyte Layer 31

The power generating element 30 includes a solid oxide electrolyte layer 31. The solid oxide electrolyte layer 31 is preferably one having high ionic conductivity. The solid oxide electrolyte layer 31 can be formed from, for example, stabilized zirconia or partially stabilized zirconia. Specific examples of stabilized zirconia include 10 mol % yttria stabilized zirconia (10YSZ) and 11 mol % scandia stabilized zirconia (11ScSZ). A specific example of partially stabilized zirconia is 3 mol % yttria stabilized zirconia (3YSZ). The solid oxide electrolyte layer 31 can also be formed from, for example, a ceria-based oxide doped with Sm, Gd and the like, or a perovskite type oxide, such as $La_{0.8}Sr_{0.2}Ga_{0.8}Mg_{0.2}O_{(3-\delta)}$, which has $LaGaO_3$ as a base and in which La and Ga are partially substituted with Sr and Mg, respectively.

Through holes 31a and 31b forming parts of channels 61 and 62 are formed in the solid oxide electrolyte layer 31 as shown in FIG. 5.

The solid oxide electrolyte layer 31 is held between an air electrode layer 32 and a fuel electrode layer 33. That is, the air electrode layer 32 is formed on one principal surface of the solid oxide electrolyte layer 31, and the fuel electrode layer 33 is formed on the other principal surface.

Air Electrode Layer 32

As shown in FIG. 4, the air electrode layer 32 has an air electrode 32a and a peripheral portion 32b. Through holes 32c and 32d forming parts of channels 61 and 62 are formed in the peripheral portion 32b.

The air electrode 32a is a cathode. In the air electrode 32a, oxygen captures electrons to form oxygen ions. The air electrode 32a is preferably one that is porous, has high electron conductivity and is resistant to a solid-solid reaction with the solid oxide electrolyte layer 31 at a high temperature. The air electrode 32a can be formed from, for example, scandia stabilized zirconia (ScSZ), indium oxide doped with Sn, a $PrCoO_3$-based oxide, a $LaCoO_3$-based oxide or a $LaMnO_3$-based oxide. Specific examples of the $LaMnO_3$-based oxide include $La_{0.8}Sr_{0.2}MnO_3$ (common name: LSM) and $La_{0.6}Ca_{0.4}MnO_3$ (common name: LCM).

The peripheral portion 32b can be formed from, for example, a material similar to that of first and second separator bodies 11 and 51 described below.

Fuel Electrode Layer 33

As shown in FIG. 6, the fuel electrode layer 33 has a fuel electrode 33a and a peripheral portion 33b. Through holes 33c and 33d forming parts of channels 61 and 62 are formed in the peripheral portion 33b.

The fuel electrode 33a is an anode. In the fuel electrode 33a, oxygen ions and a fuel gas react with each other to release electrons. The air electrode 33a is preferably one that is porous, has high electron conductivity and resists undergoing a solid-solid reaction with the solid oxide electrolyte layer 31 at a high temperature.

The fuel electrode 33a contains Ni. Specifically, the fuel electrode 33a is preferably one formed of, for example, nickel oxide, yttrium oxide stabilized zirconia (yttria stabilized zirconia (YSZ)) containing Ni, calcium oxide stabilized zirconia containing Ni, scandium oxide stabilized zirconia (scandia stabilized zirconia (ScSZ) containing Ni, cerium oxide stabilized zirconia containing Ni, titanium oxide containing Ni, alumina containing Ni, magnesia containing Ni, yttria containing Ni, niobium oxide containing Ni, tantalum oxide containing Ni and the like.

For example, when the fuel electrode 33a containing Ni is formed, destruction by stress occurring due to oxidation of nickel in the fuel cell 1 can be suppressed. Stabilized zirconia, titania, alumina, magnesia, yttria, niobium oxide, tantalum oxide and the like do not hinder either nickel-to-nickel contact or conductivity of the fuel electrode 33a because these oxides are not decomposed but exist stably when nickel oxide is reduced to nickel.

The content of Ni in the fuel electrode 33a is preferably about 20% by volume or more.

First Separator 10

As shown in FIGS. 1, 9 and 10, the first separator 10 is arranged on the air electrode layer 32 of the power generating element 30. The first separator 10 functions to form a channel 12a for supplying to the air electrode 32a an oxidant gas supplied from the oxidant gas channel 61. In a fuel cell including a plurality of power generating elements, the first separator also has a function to separate fuel gas and oxidant gas.

The first separator 10 has a first separator body 11 and a first channel forming member 12. The first separator body 11 is arranged on the air electrode 32a. Through holes 11a and 11b forming parts of channels 61 and 62 are formed in the first separator body 11.

The first channel forming member 12 is arranged between the first separator body 11 and the air electrode layer 32. The first channel forming member 12 has a peripheral portion 12b and a plurality of linear projections 12c. A through hole 12d forming part of the fuel gas channel 62 is formed in the peripheral portion 12b.

Each of a plurality of linear projections 12c is provided so as to protrude toward the air electrode layer 32 side from a surface of the first separator body 11 on the air electrode layer 32 side. Each of a plurality of linear projections 12c is provided along an x direction. A plurality of linear projections 12c are arranged at intervals from one another along the y direction. The channel 12a is dividedly formed between adjacent linear projections 12c and between the linear projection 12c and the peripheral portion 12b.

The materials of the first separator body 11 and the first channel forming member 12 are not particularly limited. Each of the first separator body 11 and the first channel forming member 12 can be formed from, for example, stabilized zirconia or partially stabilized zirconia. Each of the first separator body 11 and the first channel forming member 12 can also be formed from, for example, a conductive ceramic such as lanthanum chromite doped with a rare earth metal, strontium titanate doped with a rare earth metal, or lanthanum ferrate substituted with Al, or an insulating ceramic such as alumina, magnesia or strontium titanate.

A plurality of via hole electrodes 12c1 are embedded in each of a plurality of linear projections 12c. A plurality of via hole electrodes 12c1 are formed so as to extend through a plurality of linear projections 12c in the z direction. In the first separator body 11, a plurality of via hole electrodes 11c are formed at positions corresponding to a plurality of via hole electrodes 12c1. A plurality of via hole electrodes 11c are formed so as to extend through the first separator body 11. The plurality of via hole electrodes 11c and via hole electrodes 12c1 form a plurality of interconnectors 13 extending from a surface of the linear projection 12c on a side opposite to the first separator body 11 to a surface of the first separator body 11 on a side opposite to the linear projection 12c. The shape of the interconnector 13 is not particularly limited. For example, the interconnector 13 may have polygonal prism shape such as a quadratic prism shape or a triangle prism shape, or cylindrical shape.

The materials of the via hole electrode 11c and the via hole electrode 12c1 are not particularly limited. Each of the via hole electrode 11c and the via hole electrode 12c1 can be formed from, for example, an Ag—Pd alloy, an Ag—Pt alloy, lanthanum chromite ($LaCrO_3$) containing an alkali earth metal, lanthanum ferrate ($LaFeO_3$), or LSM.

Second Separator 50

The second separator 50 is arranged on the fuel electrode layer 33 of the power generating element 30. The second separator 50 has a function to form a channel 52a for supplying to the fuel electrode 33a a fuel gas supplied from the fuel gas channel 62. In a fuel cell including a plurality of power generating elements, the second separator also has a function to separate a fuel gas and an oxidant gas.

The second separator 50 has a second separator body 51 and a second channel forming member 52. The second separator body 51 is arranged on the fuel electrode 33a. Through holes 51a and 51b forming parts of channels 61 and 62 are formed in the second separator body 51.

The second channel forming member 52 is arranged between the separator body 51 and the fuel electrode layer 33. The second channel forming member 52 has a peripheral portion 52b and a plurality of linear projections 52c. A through hole 52d forming part of the fuel gas channel 62 is formed in the peripheral portion 52b.

Each of a plurality of linear projections 52c is provided so as to protrude toward the fuel electrode layer 33 side from a surface of the second separator body 51 on the fuel electrode layer 33 side. Each of a plurality of linear projections 52c is provided along a y direction perpendicular to a direction in which the linear projection 52c extends. A plurality of linear projections 52c are arranged at intervals from one another along an x direction. The channel 52a is dividedly formed between adjacent linear projections 52c and between the linear projection 52c and the peripheral portion 52b. Thus, the direction in which the channel 52a extends is orthogonal to the direction in which the channel 12a extends.

The materials of the second separator body 51 and the second channel forming member 52 are not particularly limited. Each of the second separator body 51 and the second channel forming member 52 can be formed from, for example, stabilized zirconia or partially stabilized zirconia. For example, each of the second separator body 51 and the second channel forming member 52 can be formed not only from a conductive ceramic such as lanthanum chromite doped with a rare earth metal etc., strontium titanate doped with a rare earth metal etc., or lanthanum ferrate substituted with Al, but also from an insulating ceramic such as alumina, magnesia or strontium titanate.

As shown in FIGS. 9 and 10, a plurality of via hole electrodes 52c1 are embedded in each of a plurality of linear projections 52c. In the second separator body 51, a plurality of via hole electrodes 51c are formed at positions corresponding to a plurality of via hole electrodes 52c1. A plurality of via hole electrodes 51c are electrically connected to a plurality of via hole electrodes 52c1. A plurality of via hole electrodes 51c are formed so as to extend through the second separator body 51. The plurality of via hole electrodes 51c and via hole electrodes 52c1 form an interconnector 14 which draws the fuel electrode 33a to outside.

The interconnector 14 has a portion containing at least one of Ag, Pd, Pt, Fe, Co, Cu, Ru, Rh, Re and Au. In this embodiment, specifically, the interconnector 14 has a portion containing Ag. More specifically, the interconnector 14 has a portion formed of an Ag—Pd alloy. Further specifically, the whole interconnector 14 is formed of an Ag—Pd alloy. Therefore, the interconnector 14 has high gas barrier performance.

In this embodiment, an interlayer 53 is arranged between the interconnector 14 and the fuel electrode 33a. Specifically, the interlayer 53 is arranged at an end on the fuel electrode 33a side of a via hole 52c2 formed in the linear projection 52c. The interconnector 14 and the fuel electrode 33a are insulated from each other by the interlayer 53.

The interlayer 53 is formed of a perovskite type conductive ceramic. In this embodiment, specifically, the interlayer 53 is formed of a perovskite type oxide represented by $ABO_3$ where A is at least one of Ca, Sr, Ba, La and Y; and B is at least one of Ti, V, Cr, Mn, Fe, Co, Mo, Ru, Rh, Pd and Re. More specifically, the interlayer 53 is formed of a perovskite type titanium oxide containing at least one selected from the group consisting of Sr, Ca and Ba. Further specifically, the interlayer 53 is formed of a perovskite type titanium oxide represented by $(D_{1-x}E_x)_z(Ti_{1-y}G_y)O_3$ where D is at least one of Sr, Ca and Ba; E is a rare earth element; G is at least one of Nb and Ta; and $0 \leq x \leq 1$, $0 \leq y \leq 0.5$ and $0.66 \leq z \leq 1.5$. Further specifically, the interlayer 53 is formed of a perovskite type titanium oxide represented by $(Sr_{1-x}Ca_x)_z(Ti_{1-y}Nb_y)O_3$ where $0.5 \leq x \leq 0.9$, $0 \leq y \leq 0.3$ and $0.66 \leq z \leq 0.95$, or a perovskite type titanium oxide represented by $(Sr_{1-x}Ca_x)_z(Ti_{1-y}Nb_y)O_3$ where $0 \leq x < 0.5$, $0 \leq y \leq 0.3$ and $0.66 \leq z \leq 0.95$.

Thus, in this embodiment, the interlayer 53 is formed of a perovskite titanium oxide, and is therefore formed of an n-type semiconductor in a reducing atmosphere. Preferably, the interlayer 53 contains an n-type dopant, although it may not contain an n-type dopant.

The interlayer 53 may be a dense layer, or may be a porous body.

As described above, the interlayer 53 formed of a conductive ceramic in this embodiment is arranged between the fuel electrode 33a containing Ni and the interconnector 14. Therefore, the life product of the fuel cell 1 is long. This is considered to be because the interlayer 53 formed of a perovskite type oxide is impervious to metals such as Ni, and therefore by the interlayer 53, degradation due to reaction of the fuel electrode 33a with the interconnector 14 can be suppressed.

Preferably, the interlayer 53 is formed of a perovskite type oxide. In this case, the electric resistance of the interlayer 53 can be decreased. Accordingly, a voltage drop resulting from provision of the interlayer 53 can be suppressed.

Preferably, the interlayer 53 is formed of a perovskite type oxide represented by $ABO_3$ where A is at least one of Ca, Sr, Ba, La and Y; and B is at least one of Ti, V, Cr, Mn, Fe, Co, Mo, Ru, Rh, Pd and Re. In this case, the electric resistance of the interlayer 53 can be decreased. Accordingly, a voltage drop resulting from provision of the interlayer 53 can be suppressed.

Preferably, the interlayer 53 is formed of a perovskite type titanium oxide containing at least one member selected from the group consisting of Sr, Ca and Ba. In this case, the interlayer 53 is an n-type semiconductor. Stability of the interlayer 53 is high in either an oxidizing atmosphere or a reducing atmosphere. Further, firing of the interlayer 53 in this case can be performed at a low temperature of, for example, 1400° C. or lower.

Preferably, the interlayer 53 is formed of a perovskite type titanium oxide represented by $(D_{1-x}E_x)_z(Ti_{1-y}G_y)O_3$ where D is at least one of Sr, Ca and Ba; E is a rare earth element; G is at least one of Nb and Ta; and $0 \leq x \leq 1$, $0 \leq y \leq 0.5$ and $0.66 \leq z \leq 1.5$. In this case, the electric resistance of the interlayer 53 can be further decreased. Accordingly, a voltage drop resulting from provision of the interlayer 53 can more effectively be suppressed.

When the interlayer 53 is formed of a perovskite type titanium oxide represented by $(Sr_{1-x}Ca_x)_z(Ti_{1-y}Nb_y)O_3$ where $0.5 \leq x \leq 0.9$, $0 \leq y \leq 0.3$ and $0.66 \leq z \leq 0.95$, the density of the interlayer 53 can be increased. Accordingly, degradation due to a reaction of the fuel electrode 33a with the interconnector 14 can be more effectively suppressed. Since the conductivity of the interlayer 53 can be enhanced, a voltage drop resulting from provision of the interlayer 53 can be suppressed. Further, firing of the interlayer 53 can be performed at a low temperature of, for example, 1200° C. or lower. Accordingly, a metal such as Ag, an alloy containing Ag or a base metal is easily used as a constituent material of the inter connector 14 etc.

On the other hand, when the interlayer 53 is formed of a perovskite type titanium oxide represented by $(Sr_{1-x}Ca_x)_z(Ti_{1-y}Nb_y)O_3$ where $0.5 \leq x \leq 0.9$, $0 \leq y \leq 0.3$ and $0.66 \leq z \leq 0.95$, the density of the interlayer 53 can be decreased. Accordingly, occurrence of cracking and peeling due to a difference in thermal expansion coefficients between the interlayer and other constituent materials is suppressed.

In this embodiment, the interlayer 53 is an n-type semiconductor. Therefore, the contact electric resistance between the interlayer 53 and each of the fuel electrode 33a as an electronic conductor and the interconnector 14 can be decreased. Accordingly, a voltage drop resulting from provision of the interlayer 53 can be suppressed.

Other examples of preferred embodiments of carrying out the present invention will be described below. In the descriptions below, members having substantially the same functions as those in the first embodiment are denoted by the same symbols, and explanations thereof are omitted.

Second to Fourth Embodiments

Figure 11:
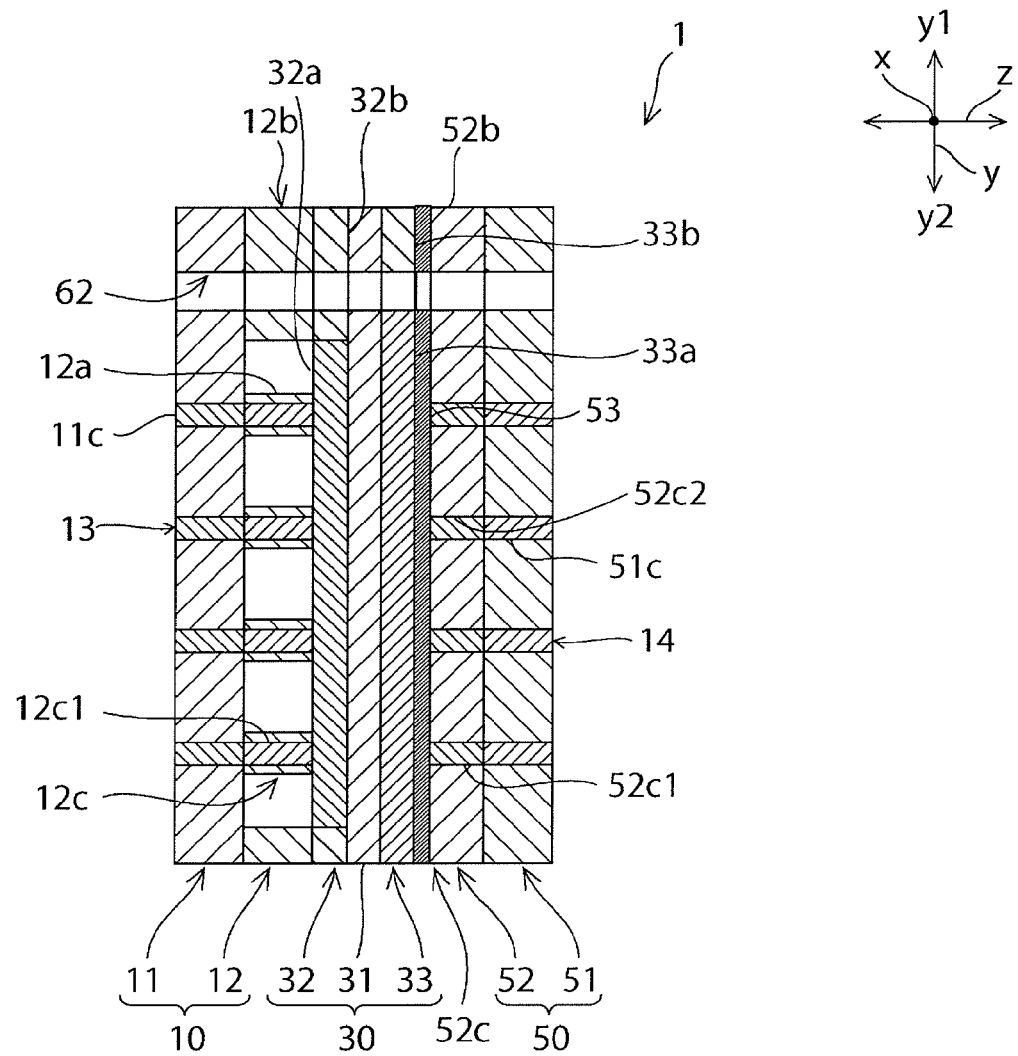
FIG. 11 is a schematic sectional view of a fuel cell according to a second embodiment.
Figure 12:
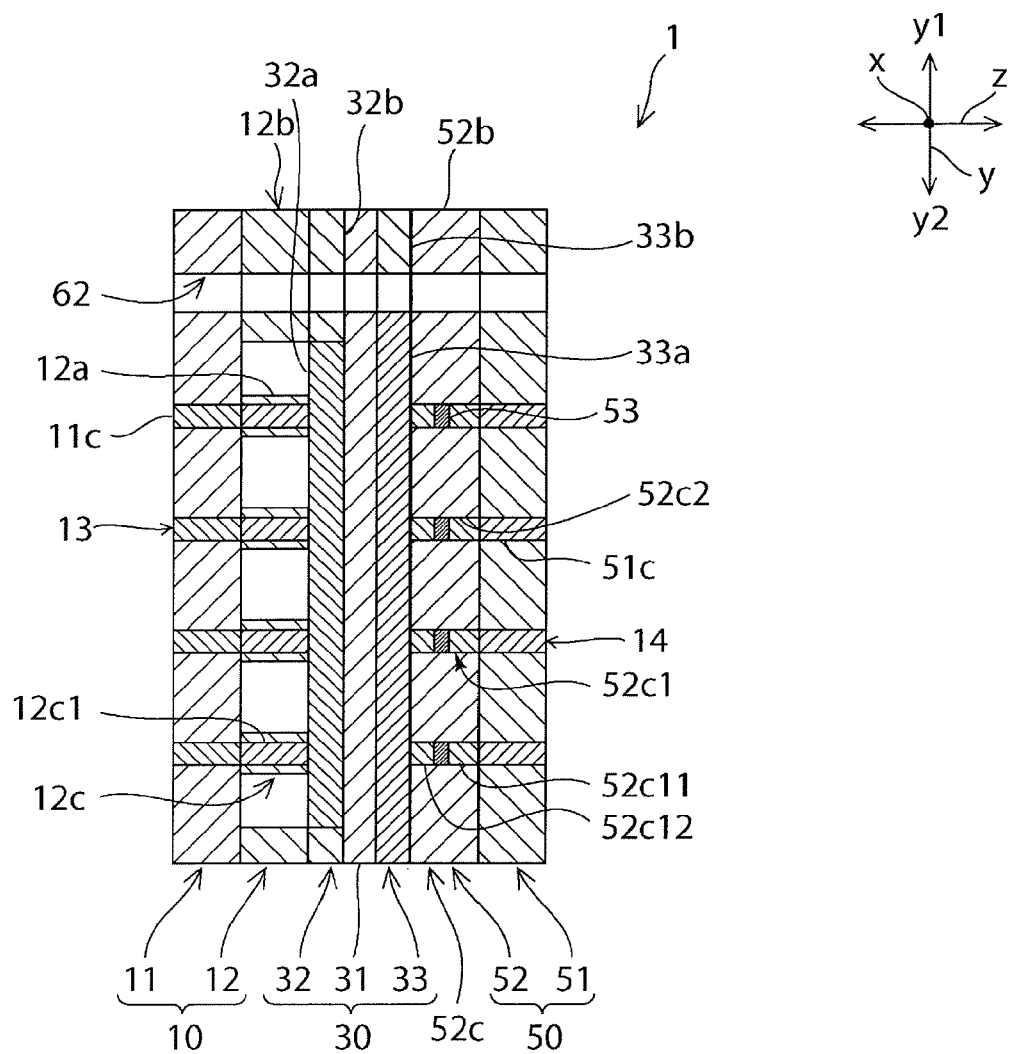
FIG. 12 is a schematic sectional view of a fuel cell according to a third embodiment.

FIG. 11 is a schematic sectional view of a fuel cell according to a second embodiment. FIG. 12 is a schematic sectional view of a fuel cell according to a third embodiment.

In the first embodiment, the interlayer 53 is arranged an end of the via hole 52c2 on the fuel electrode 33a side. However, the present invention is not limited to this configuration. For example, as shown in FIG. 11, the interlayer 53 may be provided so as to cover a surface of the fuel electrode 33a on the interconnector 14 side. Specifically, the interlayer 53 in the second embodiment is provided so as to cover a surface of the fuel electrode layer 33 on the interconnector 14 side. In the second embodiment, the interlayer 53 is formed of a porous body. Therefore, a fuel gas passes through the interlayer 53 to be supplied to the fuel electrode 33a.

The interlayer may be arranged between the second linear projection and the fuel electrode, and the interlayer may not be arranged on a portion facing the channel of the fuel electrode.

Figure 13:
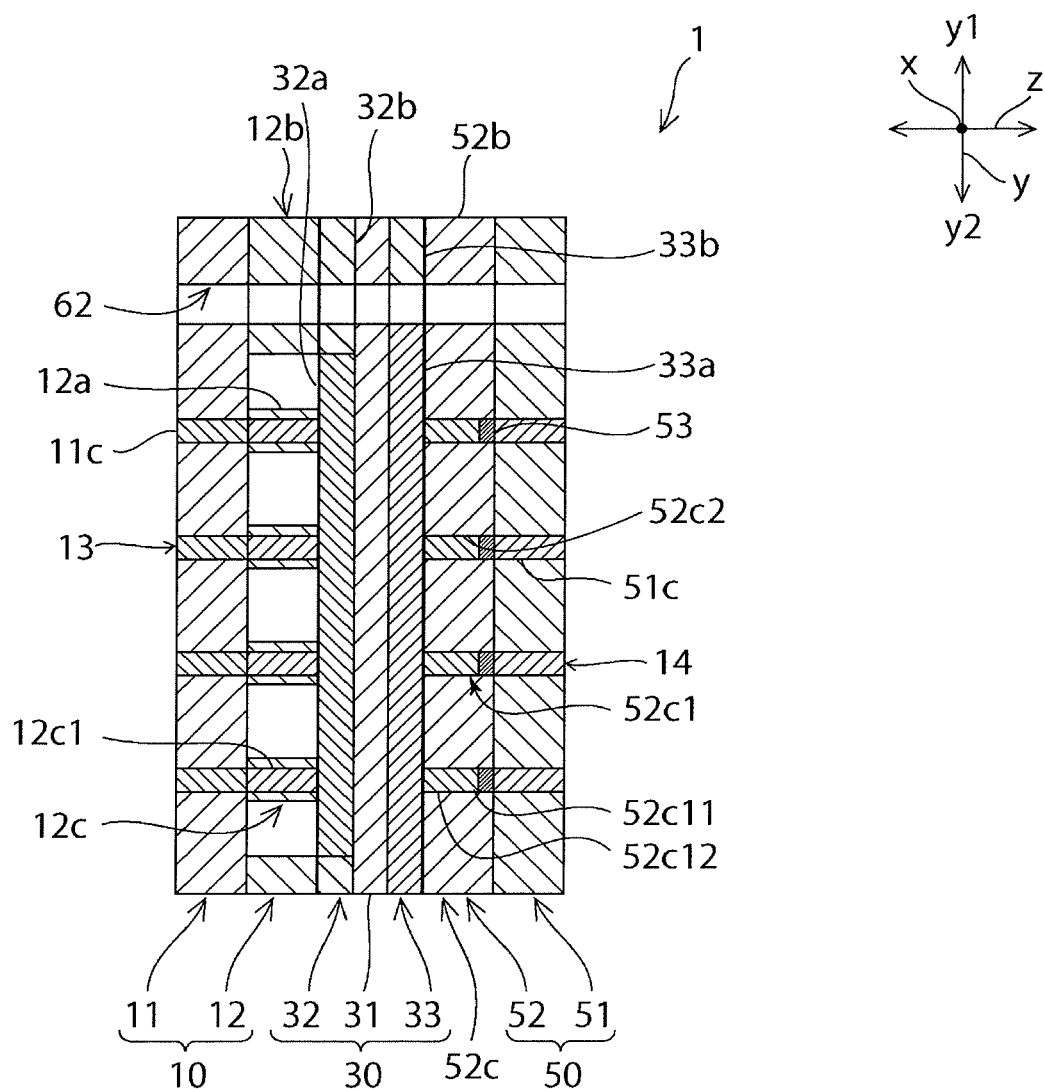
FIG. 13 is a schematic sectional view of a fuel cell according to a fourth embodiment.

As shown in FIG. 12, the interlayer 53 may be arranged at the central part of the via hole 52c2. As shown in FIG. 13, the interlayer 53 may be arranged at an end of the via hole 52c2 on the separator body 51 side. In each of third and fourth embodiments, a portion 52c11 of the interconnector 14 on the separator 50 side with respect to the interlayer 53 contains at least one of Ag, Pd, Pt, Fe, Co, Cu, Ru, Rh, Re and Au. A portion 52c12 on the fuel electrode 33a side is formed of the same material as that of the fuel electrode 33a.

EXPERIMENTAL EXAMPLE 1

$CaCO_3$, $SrCO_3$, $TiO_2$ and $Nb_2O_5$ were stoichiometrically weighed so as to lead to $(Sr_{1-x}Ca_x)_{0.9}(Ti_{0.9}Nb_{0.1})O_3$ (where x is 0, 0.3, 0.6, 0.8, 0.9 or 1.0), ground and mixed in water using zirconia balls, and the mixture was dried. Thereafter, the mixture was fired at 1000° C. for 4 hours. Next, the fired product was ground in water using zirconia balls having a diameter of 5 mm to obtain a ceramic powder. The ceramic powder, an organic solvent and a butyral-based binder were mixed to prepare a slurry. The slurry was molded into a sheet shape using a doctor blade method. Thereafter, the obtained sheet was fired at 1150° C. for 6 hours to obtain a ceramic sheet.

The density of the obtained ceramic sheet was measured. The results are shown by diamonds in the graph shown in FIG. 14.

EXPERIMENTAL EXAMPLE 2

$SrTiO_3$, $CaTiO_3$ and $Nb_2O_5$ were stoichiometrically weighed so as to lead to $(Sr_{1-x}Ca_x)_{0.9}(Ti_{0.9}Nb_{0.1})O_3$ (where x is 0, 0.4, 0.6, 0.8 or 1.0), ground and mixed in water using zirconia balls, and the mixture was dried. Thereafter, the mixture was fired at 850° C. for 4 hours. Next, the fired product was ground in water using zirconia balls having a diameter of 5 mm to obtain a ceramic powder. The ceramic powder, an organic solvent and a butyral-based binder were mixed to prepare a slurry. The slurry was molded into a sheet shape using a doctor blade method. Thereafter, the obtained sheet was fired at 1150° C. for 6 hours to obtain a ceramic sheet.

The density of the obtained ceramic sheet was measured. The results are shown by triangles in the graph shown in FIG. 14.

Figure 14:
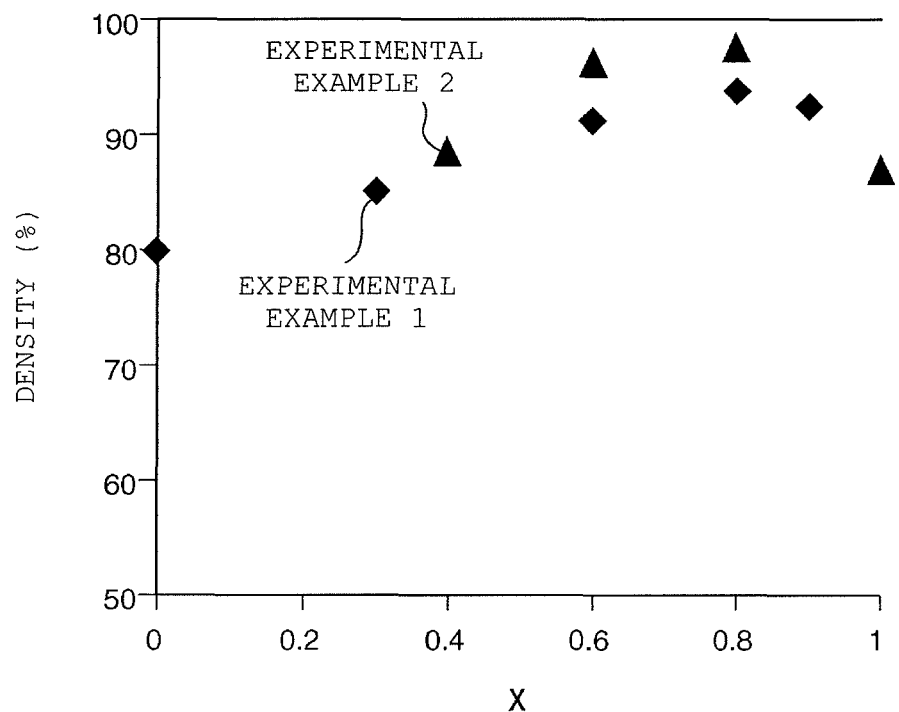
FIG. 14 is a graph showing a relationship between x and a density in Experimental Examples 1 and 2.

From the results shown in FIG. 14, it is apparent that when $0.5 \leq x \leq 0.9$, the density can be increased. On the other hand, it is apparent that when $0 \leq x < 0.5$, the density can be decreased.

EXPERIMENTAL EXAMPLE 3

$SrTiO_3$, $CaTiO_3$ and $Nb_2O_5$ were stoichiometrically weighed so as to lead to $(Sr_{0.2}Ca_{0.8})_z(Ti_{1-y}Nb_y)O_3$ (where z is 1−y, i.e. 0.91, 0.873, 0.83 or 0.77, and y is 0.09, 0.127, 0.17 or 0.23), ground and mixed in water using zirconia balls, and the mixture was dried. Thereafter, the mixture was fired at 850° C. for 4 hours. Next, the fired product was ground in water using zirconia balls having a diameter of 5 mm to obtain a ceramic powder. The ceramic powder, an organic solvent and a butyral-based binder were mixed to prepare a slurry. The slurry was molded into a sheet shape using a doctor blade method. Thereafter, the obtained sheet was fired at 1170° C. for 6 hours to obtain a ceramic sheet.

The density of the obtained ceramic sheet was then measured. The results are shown in FIG. 15.

Figure 15:
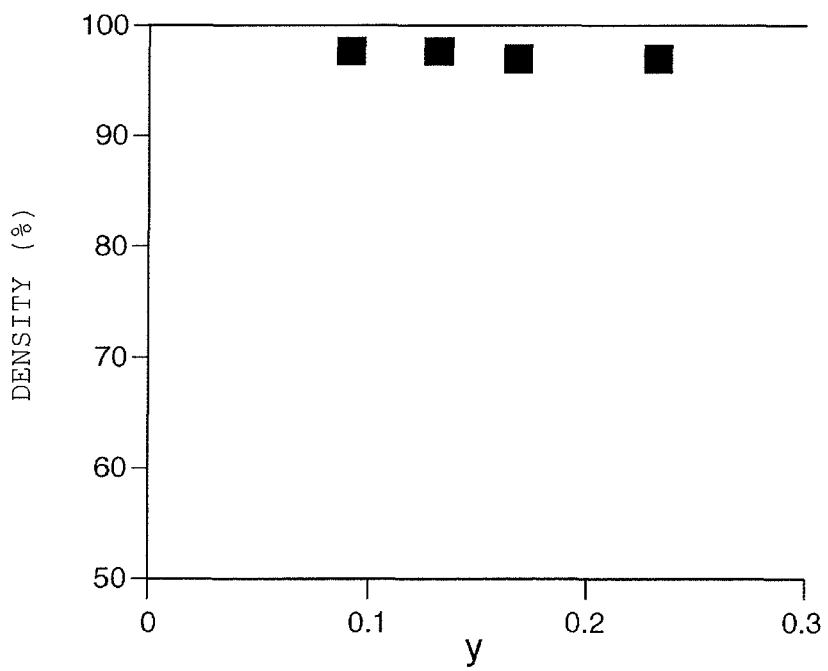
FIG. 15 is a graph showing a relationship between y and a density in Experimental Example 3.

From the results shown in FIG. 15, it is apparent that a change of y does not cause a significant change in density.

EXPERIMENTAL EXAMPLE 4

$SrTiO_3$, $CaTiO_3$ and $Nb_2O_5$ were stoichiometrically weighed so as to lead to $(Sr_{0.2}Ca_{0.8})_z(Ti_{0.9}Nb_{0.1})O_3$ (where z is 0.920, 0.927, 0.936, 0.955 or 1.000), ground and mixed in water using zirconia balls, and the mixture was dried. Thereafter, the mixture was fired at 850° C. for 4 hours. Next, the fired product was ground in water using zirconia balls having a diameter of 5 mm to obtain a ceramic powder. The ceramic powder, $SrTiO_3$, $CaTiO_3$, an organic solvent and a butyral-based binder were mixed to prepare a slurry. The slurry was molded into a sheet shape using a doctor blade method. Thereafter, the obtained sheet was fired at 1150° C. for 6 hours to obtain a ceramic sheet.

The density of the obtained ceramic sheet was measured. The results are shown in FIG. 16.

Figure 16:
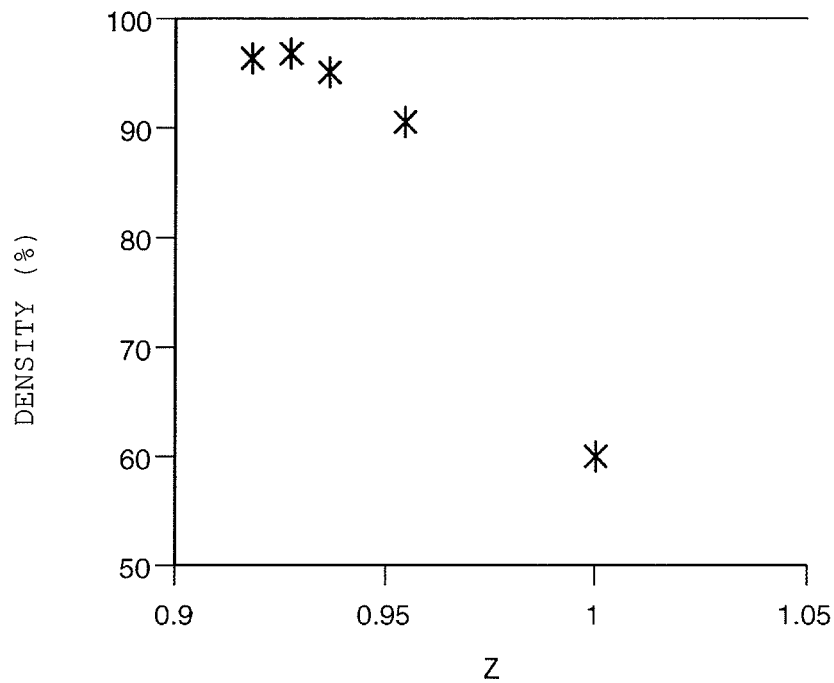
FIG. 16 is a graph showing a relationship between z and a density in Experimental Example 4.

From the results shown in FIG. 16, it is apparent that when z is less than 0.95, the density can be increased. On the other hand, it is apparent that when z is 0.95 or more, the density can be decreased.

From the results of Experimental Examples 3 and 4, the density can be increased when z is less than 0.95. For keeping a perovskite structure with stability, however, z is preferably 0.66 or more. More preferably, z is 0.90 or more.

EXAMPLE

A fuel cell having substantially the same configuration as that of the fuel cell according to the fourth embodiment was prepared under conditions shown below.

Constituent material of separator: 3YSZ ($ZrO_2$ partially stabilized with $Y_2O_3$ in an added amount of 3 mol %).

Constituent material of solid oxide electrolyte layer: ScCeSZ ($ZrO_2$ stabilized with $Sc_2O_3$ in an added amount of 10 mol % and $CeO_2$ in an added amount of 1 mol %).

Constituent material of air electrode: a material obtained by adding 30% by mass of a carbon powder to a mixture of 60% by mass of a $La_{0.8}Sr_{0.2}MnO_3$ and 40% by mass of the ScCeSZ.

Constituent material of fuel electrode: a material obtained by adding 30% by mass of a carbon powder to a mixture of 65% by mass of NiO and 35% by mass of the ScCeSZ.

Constituent material of portion of fuel electrode-side interconnector on the fuel electrode side with respect to interlayer: a mixture of 70% by mass of NiO and 30% by mass of $TiO_2$.

Constituent material of portion of interconnector on a side opposite to fuel electrode with respect to interlayer: a Pd—Ag alloy having a Pd content of 30% by mass.

Constituent material of interlayer: $(Sr_{0.2}Ca_{0.8})_{0.9}Ti_{0.9}Nb_{0.1}O_3$.

Diameter of via hole: 0.2 mm.
Thickness of interlayer: 30 μm
Thickness of fuel electrode: 30 μm
Thickness of air electrode: 30 μm
Thickness of solid oxide electrolyte layer: 30 μm
Height of linear projection: 240 μm
Thickness of separator body: 360 μm
Press condition before firing: 1000 kgf/cm²
Firing temperature: 1150° C.
Preparation of interlayer: $SrTiO_3$, $CaTiO_3$ and $Nb_2O_5$ were weighed, ground and mixed in water using zirconia balls, and the mixture was dried. Thereafter, the mixture was fired at 850° C. for 4 hours. Next, the fired product was ground in water using zirconia balls having a diameter of 5 mm to obtain a ceramic powder. The ceramic powder, CaCO₃ and SrCO₃, an organic solvent and a butyral-based binder were mixed to prepare a slurry. Via holes were filled with the obtained slurry. Thereafter, integral firing with other constituent members was performed.

Comparative Example

A fuel cell was prepared in the same manner as in Example except that an interlayer was not provided.
Evaluation
A 66% $H_2$-$N_2$ gas containing 15.5% of water vapor and an oxidant gas were passed at 750° C. through the fuel cell prepared in each of the Example and Comparative Example described above, thus causing the fuel cell to generate power, and an energization test was conducted at 0.4 A/cm². The results are shown in FIG. 17.

Figure 17:
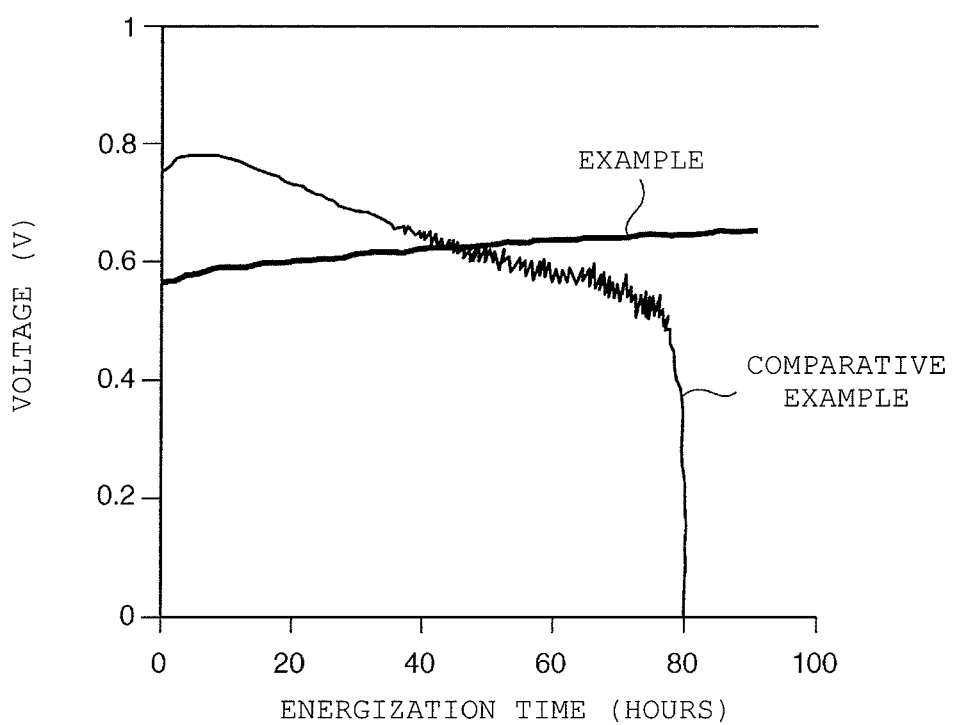
FIG. 17 is a graph showing the results of energization tests of fuel cells prepared, respectively, in Example and Comparative Example.

As apparent from the results shown in FIG. 17, the voltage was hard to decrease in the Example in which an interlayer was provided, as compared to Comparative Example in which an interlayer was not provided. Therefore, it is apparent that by providing an interlayer, the battery life of the fuel cell can be increased.

DESCRIPTION OF REFERENCE SYMBOLS

1 . . . fuel cell
10 . . . first separator
11 . . . first separator body
11a, 11b . . . through hole
11c . . . via hole electrode
12 . . . first channel forming member
12a . . . first channel
12b . . . peripheral portion
12c . . . first linear projection
12c1 . . . via hole electrode
12d . . . through hole
13, 14 . . . interconnector
30 . . . power generating element
31 . . . solid oxide electrolyte layer
31a, 31b . . . through hole
32 . . . air electrode layer
32a . . . air electrode
32b . . . peripheral portion
32c, 32d . . . through hole
33 . . . fuel electrode layer
33a . . . fuel electrode
33b . . . peripheral portion
33c, 33d . . . through hole
50 . . . second separator
51 . . . second separator body
51a, 51b . . . through hole
51c1 . . . via hole electrode
52 . . . second channel forming member
52a . . . channel
52b . . . peripheral portion
52c . . . via hole electrode
52c . . . second linear projection
52d . . . through hole
61 . . . oxidant gas channel
62 . . . fuel gas channel

The invention claimed is:

1. A fuel cell comprising:
a power generating element having a solid oxide electrolyte layer, a first electrode arranged on one principal surface of the solid oxide electrolyte layer, and a second electrode arranged on the other principal surface of the solid oxide electrolyte layer;
a separator disposed on the first electrode and forming a channel facing the first electrode;
an interconnector connected to the first electrode,
wherein the first electrode comprises Ni,
the interconnector has a portion formed of an Ag-Pd alloy,
the fuel cell further comprises a conductive ceramic interlayer arranged between the portion of the interconnector formed of the Ag-Pd alloy and the first electrode, and the interlayer is in contact with the first electrode,
the interlayer comprises a perovskite type oxide, and
the perovskite type oxide is $(Sr_{1-x}Ca_x)_z(Ti_{1-y}Nb_y)O_3$ in which $0.5 \leq x \leq 0.9$, $0 \leq y \leq 0.3$ and $0.66 \leq z \leq 0.95$.

2. The fuel cell according to claim 1, wherein the interlayer comprises a n-type semiconductor.

3. The fuel cell according to claim 1, wherein the first electrode comprises a member of the group consisting of nickel oxide, yttrium oxide stabilized zirconia containing Ni, calcium oxide stabilized zirconia containing Ni, scandium oxide stabilized zirconia containing Ni, cerium oxide stabilized zirconia containing Ni, titanium oxide containing Ni, alumina containing Ni, magnesia containing Ni, yttria containing Ni, niobium oxide containing Ni and tantalum oxide containing Ni.

* * * * *